US011070634B2

(12) United States Patent
Bondalapati et al.

(10) Patent No.: US 11,070,634 B2
(45) Date of Patent: *Jul. 20, 2021

(54) HIGHLY AVAILABLE PRIVATE CLOUD SERVICE

(71) Applicant: Lenovo Global Technologies International Limited, Quarry Bay (HK)

(72) Inventors: Kiran Bondalapati, Los Altos, CA (US); Ajay Gulati, Santa Clara, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 146 days.

This patent is subject to a terminal disclaimer.

(21) Appl. No.: 16/659,853

(22) Filed: Oct. 22, 2019

(65) Prior Publication Data

US 2020/0053170 A1  Feb. 13, 2020

Related U.S. Application Data

(63) Continuation of application No. 15/674,381, filed on Aug. 10, 2017, now Pat. No. 10,498,837.

(60) Provisional application No. 62/373,923, filed on Aug. 11, 2016.

(51) Int. Cl.
*H04L 29/08* (2006.01)

(52) U.S. Cl.
CPC .............. *H04L 67/16* (2013.01); *H04L 67/10* (2013.01); *H04L 67/02* (2013.01)

(58) Field of Classification Search
USPC ........................................................ 709/201
See application file for complete search history.

(56) References Cited

U.S. PATENT DOCUMENTS

| | | | |
|---|---|---|---|
| 10,659,523 B1 * | 5/2020 | Joseph | H04L 63/0209 |
| 2004/0125130 A1 * | 7/2004 | Flamini | G06F 16/958 |
| | | | 715/738 |
| 2013/0097536 A1 * | 4/2013 | Kimball | G06F 16/957 |
| | | | 715/765 |
| 2014/0229848 A1 * | 8/2014 | Zhang | G06F 3/0484 |
| | | | 715/745 |
| 2016/0306998 A1 * | 10/2016 | Rosenberg | G06F 16/951 |

* cited by examiner

*Primary Examiner* — Wing F Chan
*Assistant Examiner* — Leon Y Tseng
(74) *Attorney, Agent, or Firm* — Jeffrey L. Streets

(57) ABSTRACT

A first cluster of servers maintains a shared database that stores, for each of a plurality of cloud service consumers, user interface data for the cloud service consumer, wherein each server in the first cluster can read and write to the shared database. The first cluster further receives, from a customer computer, a request to access services of an identified cloud service consumer among the plurality of cloud service consumers, wherein the customer computer is associated with a customer of the identified cloud service consumer. Still further, the first cluster retrieves the user interface data of the identified cloud service consumer from the shared database; retrieves, from a second cluster of servers maintained by the identified cloud service consumer, user data required in response to the request; and provides the user interface data of the identified cloud service consumer and the user data to the customer computer.

20 Claims, 9 Drawing Sheets

HIGHLY AVAILABLE PRIVATE CLOUD SERVICE

CROSS-REFERENCE TO RELATED APPLICATIONS

This application is a continuation of U.S. Non-Provisional Patent Application No. 15/674,381 filed on Aug. 10, 2017, which claims priority to U.S. Provisional Patent Application No. 62/373,923 filed on Aug. 11, 2016, where each of the foregoing applications are incorporated by reference herein.

BACKGROUND

The present disclosure relates to the operation of a cloud service.

Background of the Related Art

Enterprises naturally desire to possess an IT infrastructure that is aligned with and supportive of their business requirements and objectives. To achieve this goal, many enterprises are increasingly relying upon a private cloud infrastructure. A private cloud is a type of cloud computing that delivers similar advantages as a public cloud, including scalability and self-service. Unlike public clouds, which deliver services to multiple organizations, a private cloud is dedicated to a single organization and is under the control of that organization.

Unfortunately, private cloud infrastructures are costly to build and maintain, which is true regardless of whether the measure of the cost is based on time, resources, or money. This cost is in part due to IT organizations generally not being able to cope with the increased complexity typical of private cloud infrastructures.

BRIEF SUMMARY

Some embodiments provide one or more non-transitory machine-readable storage mediums storing one or more sequences of program instructions for operating a first cluster of servers, the program instructions being configured to be executable by one or more processors of the first cluster of servers to perform operations, the operations comprising: maintaining a shared database that stores, for each of a plurality of cloud service consumers, user interface data that describes an appearance of a user interface for the cloud service consumer, wherein each server in the first cluster can read and write to the shared database; receiving, from a customer computer, a request to access services of an identified cloud service consumer among the plurality of cloud service consumers, wherein the customer computer is associated with a customer of the identified cloud service consumer; retrieving the user interface data of the identified cloud service consumer from the shared database; retrieving, from a second cluster of servers maintained by the identified cloud service consumer, user data required in response to the request; and providing the user interface data of the identified cloud service consumer and the user data to the customer computer.

Some embodiments provide a method for operating a first cluster of servers, comprising: maintaining a shared database that stores, for each of a plurality of cloud service consumers, user interface data that describes an appearance of a user interface for the cloud service consumer, wherein each server in the first cluster can read and write to the shared database; receiving, from a customer computer, a request to access services of an identified cloud service consumer among the plurality of cloud service consumers, wherein the customer computer is associated with a customer of the identified cloud service consumer; retrieving user interface data from the shared database; retrieving from a second cluster of servers maintained by the identified cloud service consumer, user data required in response to the request; and providing the user interface of the identified cloud service consumer and the user data to the customer computer.

Some embodiments provide one or more non-transitory machine-readable storage mediums storing one or more sequences of program instructions for operating a first cluster of servers, the program instructions being configured to be executable by one or more processors of the first cluster of servers to perform operations comprising: maintaining a shared database that stores, for each of a plurality of cloud service consumers, user interface data that describes an appearance of a user interface for the cloud service consumer, wherein each server in the first cluster can read and write to the shared database; receiving, from each of a plurality of customer computers, a request to access services of an identified cloud service consumer among the plurality of cloud service consumers, wherein each of the customer computers is associated with a customer of one or more of the cloud service consumers; retrieving, for each request, user interface data from the shared database and providing the user interface of the identified cloud service consumer to a web browser on the customer computer from which the request was received; retrieving, for each request, user data of the customer associated with the customer computer from which the request was received; and providing, for each request, the retrieved user data to the web browser on the customer computer from which the request was received, wherein the user data of the customer is retrieved from a separate cluster of servers maintained by the identified cloud service consumer that was identified in the request.

BRIEF DESCRIPTION OF THE SEVERAL VIEWS OF THE DRAWINGS

Embodiments disclosed herein are illustrated by way of example, and not by way of limitation, in the figures of the accompanying drawings and in which like reference numerals refer to similar elements and in which.

DETAILED DESCRIPTION

Approaches for the automated provisioning of a private cloud infrastructure are presented herein. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form or discussed at a high level in order to avoid unnecessarily obscuring teachings of the embodiments.

Functional Overview

Some embodiments may be used to realize a highly available private cloud infrastructure usable in tandem by a plurality of different businesses. The private cloud infrastructure of some embodiments may offer a highly professional user experience. The techniques discussed herein are a significant departure from current cloud computing paradigms. According to some embodiments, a portion of the infrastructure that enables the highly-available private cloud service may reside locally with the business using the private cloud service (the "cloud service consumer") while another portion may reside remotely at the private cloud service provider (the "cloud-service provider"). For example, the workload for the private cloud service, which includes for example, virtual machines, all user data, bare-metal hardware, and containers, may reside on premise at the cloud-service consumer; the user interface (UI), operational metadata (such as statistics on CPU usage, memory, persistent storage usage, and the like), and other software resources may reside at the cloud-service provider.

New Cloud Paradigm

Figure 1A:
FIGS. 1A and 1B illustrate a high level difference between some embodiments and the prior art.
Figure 1B:

FIGS. 1A and 1B illustrate high level differences between some embodiments and the prior art. FIG. 1A depicts how a user currently interacts with an exemplary public cloud, namely Amazon Web Services (AWS) provided by Amazon.com, Inc. of Seattle, Wash., according to the present state of the art.

As depicted in FIG. 1A, when a person interacts with Amazon Web Services (AWS) Cloud Service, a service available from Amazon Web Services, that end user uses a web browser to visit Amazon Web Services (AWS) web site, and in doing so, the person interacts with Amazon Web Services (AWS) Cloud Service's user interface. Amazon Web Services (AWS) Cloud Service web site stores and retrieves all data from Amazon Web Services (AWS) Cloud Service's data center. Businesses do not maintain custody over the physical machines which execute the processes performing computations involving their data. Furthermore, such businesses cannot modify the operation or appearance of Amazon Web Services (AWS) Cloud Service web site to suit their own business needs or tastes. Other examples of similar prior art approaches include Microsoft Azure offered by Microsoft, Inc. and the Google Cloud offered by Google, Inc.

FIG. 1B depicts the high level interaction between a user (i.e., a customer of the cloud service consumer) using the highly-available private cloud service offered by a cloud service provider according to an embodiment. The cloud service consumer (i.e., the business selling to the user) employs the services of the cloud service provider to obtain the infrastructure necessary to realize the highly-available private cloud service. The user may use a web browser to visit a web site associated with the cloud service provider. In the case of FIG. 1B, the user interface (i.e., the web site) is operated by the cloud service provider. However, the web site stores and maintains all user data in the data center of the cloud service consumer rather than at the cloud service provider. The cloud service consumer of FIG. 1B may operate their own computer systems at their own location, and using their own computer systems, maintain all their data and perform all operations involving such data. The cloud service consumer's computer systems are designed to operate with other computer systems maintained by the cloud service provider. However, doing so in a scalable manner requires a considerable advancement over the current state of the art. The subject of how to implement the computerized infrastructure at the cloud service provider and the cloud service consumer will be the subject of much of the discussion herein.

Highly Available Private Cloud Infrastructure

Figure 2:
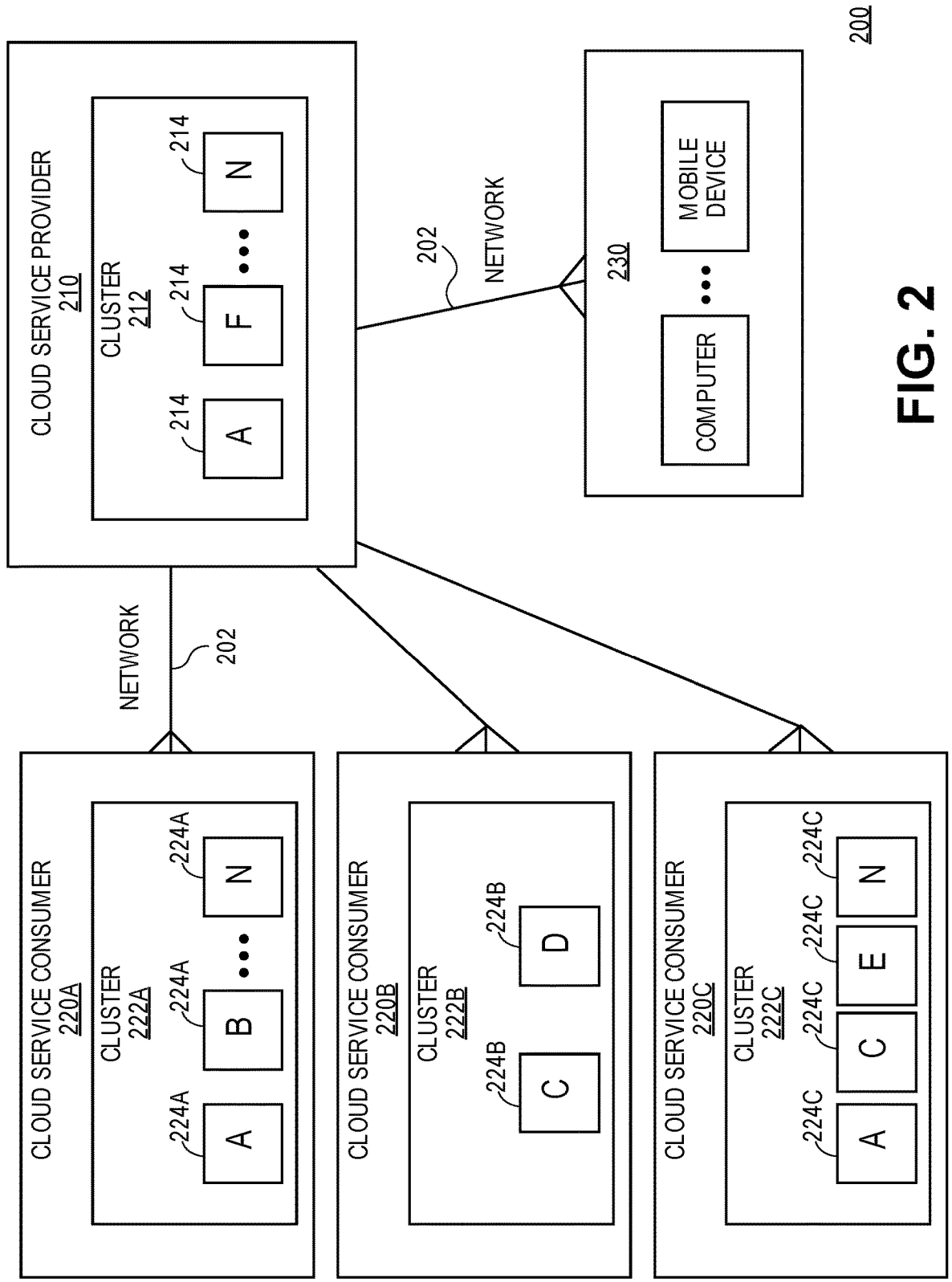
FIG. 2 is a block diagram depicting a system according to an embodiment.

Numerous technological advances are needed to be realized in order for the architecture of FIG. 1B to operate in a highly-available and scalable manner. To appreciate such advances, it will be helpful to review FIG. 2, which is a block diagram depicting a system 200 according to an embodiment. As shown in FIG. 2, system 200 includes a cloud service provider 210, several cloud service consumers 220, and one or more users 230. User 230 is meant to depict in FIG. 2 one of the many users of cloud-service consumer 220. As shown in FIG. 2, each user 230 may use any number of devices or computers to communicate with cloud service provider 210, e.g., FIG. 2 depicts user 230 using one or more of a computer and a mobile device.

For ease of explanation, only three cloud service consumers 220 (each identified using a suffix A, B, or C appended to the numerical label of each component) and only one user 230 are depicted in FIG. 2; however, it shall be appreciated that any number of cloud service consumers 220 may use the private cloud service offered by cloud service provider 210. Similarly, each cloud service consumer 220 may have any numbers of users 230.

FIG. 2 depicts cloud service provider 210 communicating with each cloud service consumer 220 over a network 202. FIG. 2 also depicts cloud service provider 210 communicating with the users 230 of cloud service consumer 220 over network 202. Network 202 represents any number of any wired or wireless network for exchanging digital communications. Network 202 may correspond to the Internet and/or any number of private networks.

Cloud service provider 210 maintains and operates a cluster 212. Similarly, cloud service consumer 220 maintains and operates a cluster 222. Cluster 212 and cluster 222 each represent a set of one or more hardware nodes (such as nodes 214 and nodes 224 respectively) executing software which work together as a functional unit. Cluster 212 may be comprised of any number of hardware nodes 214; cluster 222 may be comprised of any number of hardware nodes 224.

Figure 3:
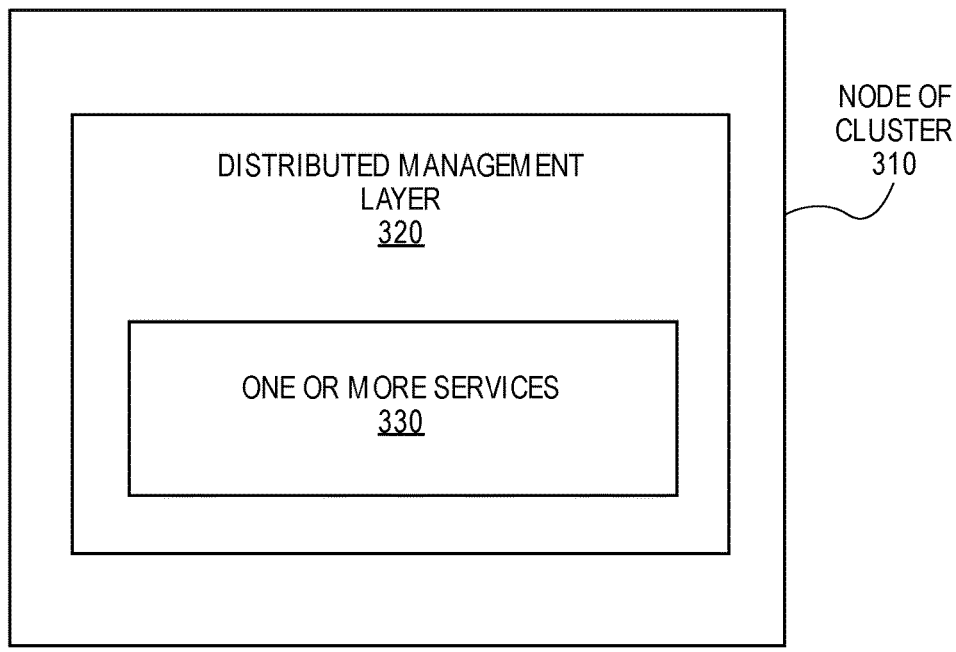
FIG. 3 is a block diagram of an exemplary node of a cluster according to an embodiment.

FIG. 3 depicts a block diagram of an exemplary node 310 of a cluster according to an embodiment. The exemplary node 310 shown in FIG. 3 may be part of either cluster 212 or cluster 222. As depicted in FIG. 3, each node of cluster 212 or cluster 222 may execute software organized in a distributed management layer 320.

In an embodiment, node 310 executes software that functions as part of a distributed management layer 320 for the cluster to which it belongs. For example, each cluster 212 will have a separate distributed management layer 320 from the distributed management layer 320 in cluster 222. Each distributed management layer 320 of a cluster functions as a single functional unit in that cluster. Distributed management layer 320, among other functions described below, facilitates communication between nodes of the cluster, monitors hardware and software activity in the cluster, ensures high availability of the cluster, and performs self-healing operations for activity in the cluster.

FIG. 3 depicts distributed management layer 320 as comprising one or more services 330. Embodiments may employ a variety of different types and numbers of services 330. To illustrate one example, in an embodiment, one or more of services 330 may correspond to an OpenStack service, a Docker service, or Kubernetes service. OpenStack is a free and open-source cloud-computing software platform. Users primarily deploy it as an infrastructure-as-a-service (IaaS). To illustrate a concrete example, the OpenStack architecture is described in additional detail below; however, the same principles apply to other services managed by the distributed services management layer.

OpenStack has a modular architecture with various code names for its components. Nova, Glance, Swift, Horizon, Keystone, Neutron, and Cinder are OpenStack components, each of which may correspond to a service included within one or more services 330. Nova is a cloud computing fabric controller, which is the main part of an IaaS system. Nova is designed to manage and automate pools of computer resources and can work with widely available virtualization technologies, as well as bare metal and high-performance computing (HPC) configurations. Glance provides discovery, registration, and delivery services for disk and server images. Swift is a scalable redundant storage system. Using Swift, or with some other object storage service, objects and files are written to multiple disk drives spread throughout servers in the data center, with the OpenStack software responsible for ensuring data replication and integrity across the cluster. Horizon provides administrators and users a graphical interface to access, provision, and automate cloud-based resources. Keystone provides a central directory of users mapped to the OpenStack services they can access. Keystone acts as a common authentication system across the cloud operating system and can integrate with existing backend directory services like LDAP. Neutron is a system for managing networks and IP addresses. Cinder provides persistent block-level storage devices for use with OpenStack compute instances.

The above examples of services that may be included in one or more services 330 is not meant to be an exhaustive list, as one or more services 330 may be composed of many other types of services. For example, other OpenStack services, such as Heat, Ceilometer, Trove, Sahara, Ironic, Zaqar, Manila, Designate, and Barbican may each be included in one or more services 330. One or more services 330 may also partially or entirely be composed of nonOpenStack services, such as Cassandra, which is a distributed key-value store or other platforms/services for managing the instantiation of containers and/or virtual machines.

As each of one or more services 330 should be continuously executing, in an embodiment, distributed management layer 320 continuously monitors the health of the one or more services 330 to ensure that each of the one or more services 330 is executing per expectations. Distributed management layer 320 will continually monitor and probe each of the one or more services 330 to detect any operational problems or issues, such as but not limited to a crash, a software fault, a hardware fault (such as an issue pertaining to persistent storage, a network, or power).

In an embodiment, distributed management layer 320 may specify the operation of each of the one or more services 330 at a fine grain degree of granularity. Distributed management layer 320 may be configured to ensure at least a specified number of each service of the one or more services 330 are executing in the cluster or on each node of the cluster. For example, distributed management layer 320 may be configured to ensure 1 Keystone service, 1 Neutron service, and 1 Cinder service are executing on each node of the cluster and at least 2 Nova services are executing in the cluster.

Distributed management layer 320 continuously performs health checks on each of the one or more services 330. Distributed management layer 320 is adapted to recover from any problems detecting in one or more of services 330; thus the availability of the one or more services 330 is guaranteed. When a software service is restarted, depending on the nature of the problem, distributed management layer 320 may determine that the service should be restarted at a different node than on which the service originally executed.

One of the primary purposes of distributed management layer 320 is to ensure the high availability of, and self-healing to, each of the one or more services; additional details for how distributed management layer 320 operates to achieve these functions will be presented below.

In an embodiment, distributed management layer 320 may use an approach for determining which node of a cluster is currently acting a leader. For example, one embodiment may use a Paxos algorithm to choose which node of the cluster is currently acting as a leader. Paxos is a family of protocols for solving consensus in a network of unreliable processors. Consensus is the process of agreeing on one result among a group of participants. This problem becomes difficult when the participants or their communication medium may experience failures. As shall be discussed in greater detail below, the node which is operating as a leader of cluster 212 or cluster 222 may perform special functions.

Cloud-Service Consumer Operation

In the description below, certain terminology has been adopted to refer to whether a component resides at the cloud-service provider (and thus is part of cluster 212) or whether the component resides at the cloud-service consumer (and this is part of cluster 222). If a component resides at the cloud-service provider (and thus is part of cluster 212), then the name of the component may have a "Sky" prefix. Alternately, if the component resides at the cloud service consumer (and this is part of cluster 222), then the name of the component may have a "Star" prefix.

Figure 4:
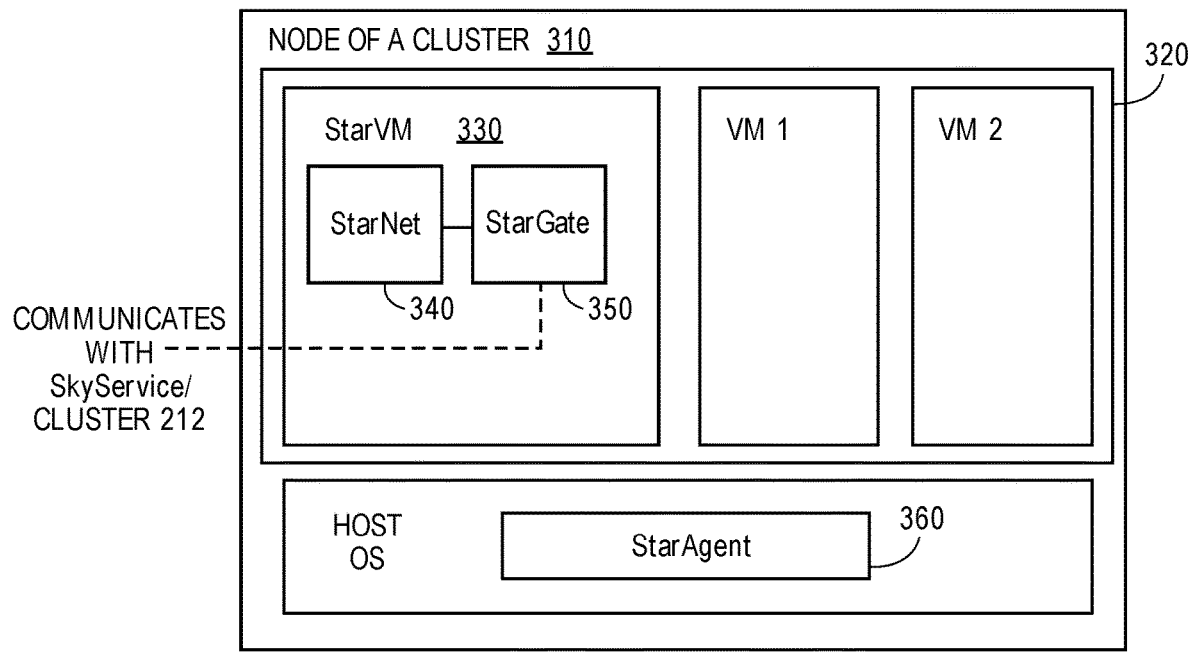
FIG. 4 is a block diagram of an illustrative node at the cloud-service consumer according to an embodiment.

To illustrate the use of this terminology, consider FIG. 4, which is a block diagram of an illustrative node at the cloud-service consumer according to an embodiment (i.e., FIG. 4 depicts an example where node 310 is part of cluster 222). As depicted in FIG. 4, distributed management layer 320 on node 310 comprises several additional components other than one or more services 330 (which is not depicted in FIG. 4 for clarity). Star virtual machine (or simply "StarVM") 330 executes alongside of other user or service virtual machines on node 310. StarVM 330 represents a special virtual machine or isolated environment (such as one or more containers) in which StarNet 340 and StarGate 350 may execute. Other similar or complimentary processes may execute in StarVM 330 as well.

StarNet 340 represents a software component responsible for communicating with other StarNets 340 residing on other nodes of cluster 222. As StarNet 340 communicates with other StarNets 340 on other nodes of cluster 222, this avoids the need for other Star components (such as StarGate 350 and StarAgent 360) to be aware of each other.

StarGate 350 represents a component responsible for communicating with cluster 212, which is the cluster of cloud-service provider 210. StarGate 350 communicates with a software component at cluster 212 termed a SkyGate. The communication between a StarGate and a SkyGate shall be explained in additional detail below with reference to FIG. 5.

StarAgent 360 represents a software component responsible for monitoring hardware and software resources of node 310. The work of monitoring hardware and software resources of node 310 requires that StarAgent 360 reside in a location where those resources are visible and accessible to StarAgent 360. Consequently, StarAgent 360, in certain embodiments, executes in the host operating system rather than a virtual machine, such as StarVM 330. In other embodiments, StarAgent 360 may execute in an isolated environment, such as but not limited to a virtual machine or container.

As part of the work of monitoring software resources of node 310, StarAgent 360 monitors the operation of StarNet 340 and StarGate 350. If StarAgent 360 detects that either StarNet 340 or StarGate 350 have ceased execution, then StarAgent 360 attempts to re-execute the software component that ceased execution. StarAgent 360 provides data about the health of the hardware and software resources of node 310 to StarNet 340. In an embodiment, a separate watcher process monitors StarNet 340 and StarGate 350. Such a watcher process may be designed to be self-monitored using a parent and child process, where one or more child processes perform the work and the parent process monitors all child processes.

Communication from the Cloud-Service Consumer to the Cloud Service Provider

Figure 5:
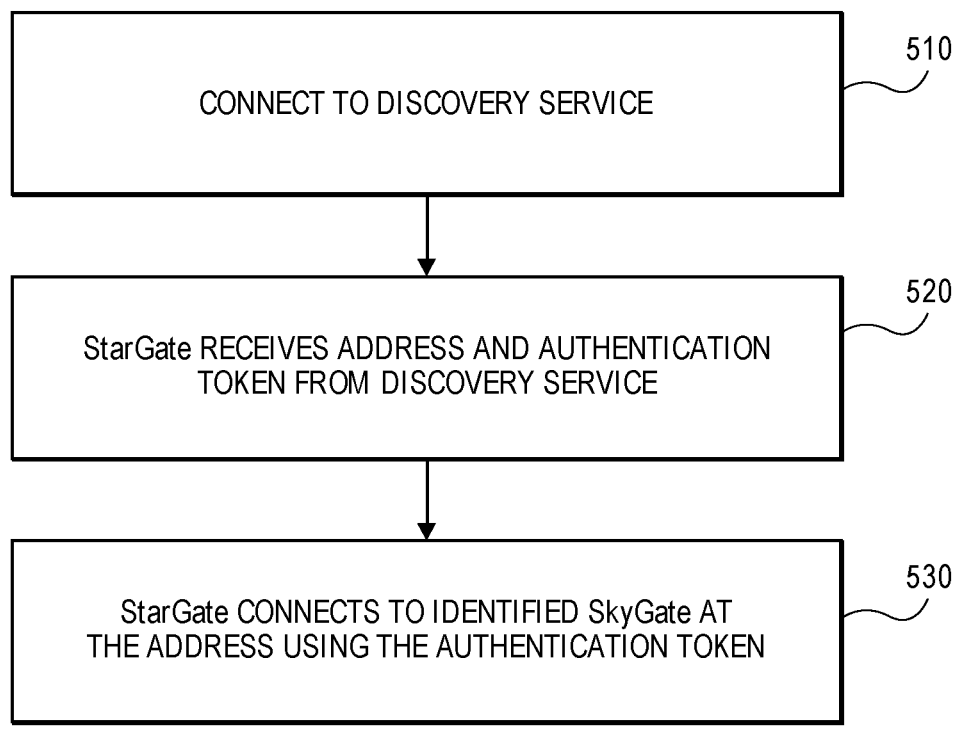
FIG. 5 is a flowchart of the steps performed by StarGate in establishing a communication channel with a particular SkyGate according to an embodiment.

FIG. 5 is a flowchart of the steps performed by StarGate 350 in establishing a communication channel with a particular SkyGate according to an embodiment. The steps of FIG. 5 are performed because the architecture of an embodiment is not a static but dynamic—this is to say that StarGates and SkyGates may be instantiated or de-instantiated over time, and so at any particular point in time there is no certainty as to how to communicate with any particular SkyGate. To resolve this quandary, the handshake process of FIG. 5 is performed by some embodiments.

Figure 6:
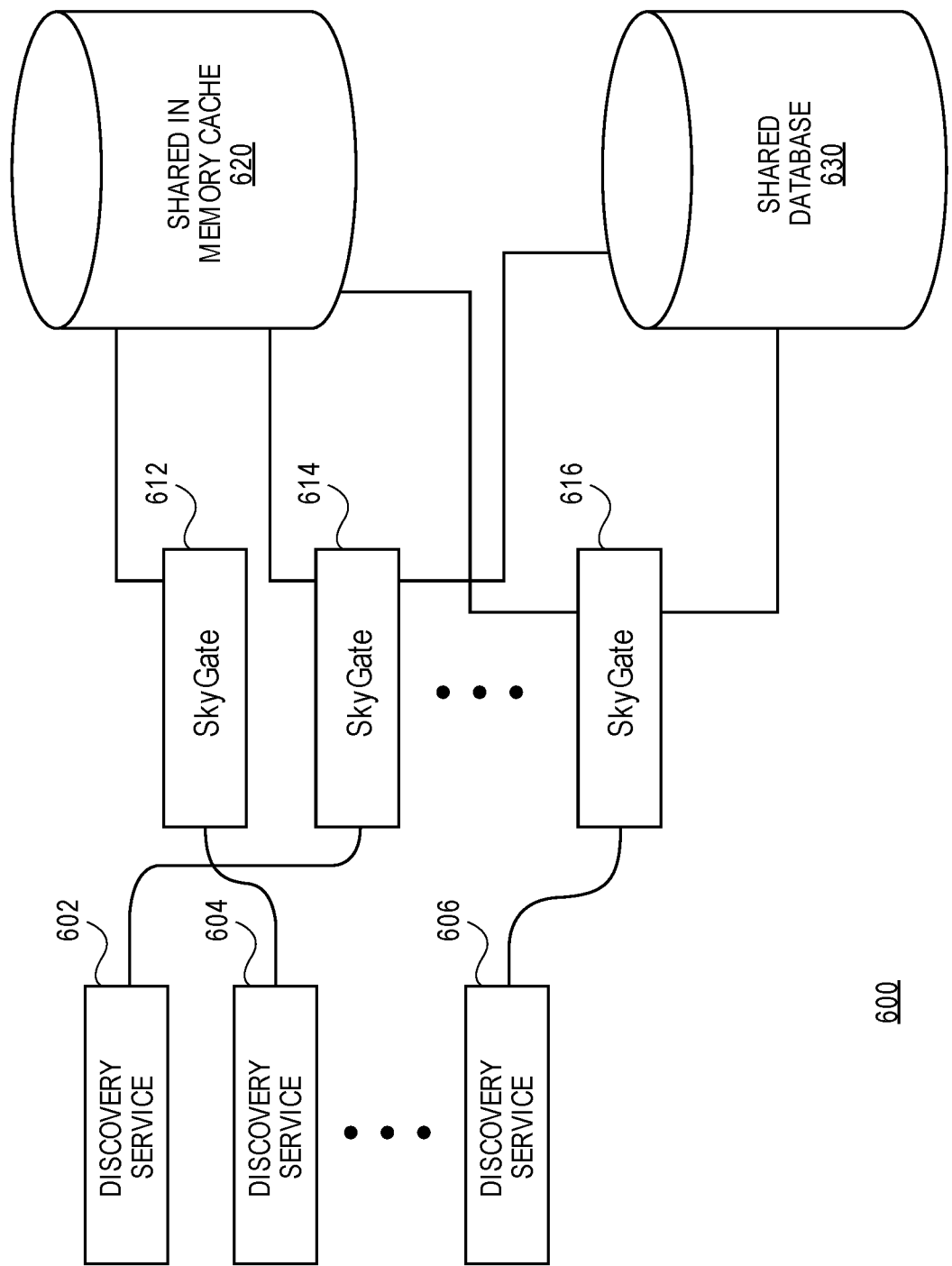
FIG. 6 is a block diagram of three discovery services according to an embodiment.

The steps of FIG. 5 may make reference to the StarGate 350 depicted in FIG. 4 as well as certain components depicted in FIG. 6, which is a block diagram illustrating certain cluster 212 according to an embodiment.

Returning to FIG. 5, initially in step 510, StarGate 350 connects to a software component at cluster 212 termed a discovery service. FIG. 6 depicts three such discovery services, namely 602, 604, and 606, according to an embodiment. Cluster 212 may instantiate any number of discovery services. Each discovery service 602, 604, 606 may be remotely reached using a single common address, such as but not limited to a web URL. Indeed, the communication by StarGate 350 to a particular discovery service may be performed using the HTTPS protocol (using port 443).

As each discovery service 602, 604, 606 may be remotely reached using a single common address, each StarGate 350 in cluster 222 may be provided with that single common address so that each StarGate 350 may contact a discovery service at cluster 212, regardless of how many discovery services happen to be instantiated at that particular moment.

When StarGate 350 contacts a discovery service in step 510, the StarGate 350 provides information that sufficiently identifies the particular StarGate 350 to cluster 212. Such identifying information may include an account identifier, a security certificate, and other details, such as machine identifier and/or cluster identifier.

When cluster 212 receives the communication from the StarGate 350, it will be handled by a particular discovery service. For ease of providing a concrete example, the steps of FIG. 5 will be explained with reference to discovery service 602 being assigned responsibility to process a message from StarGate 350 sent using the HTTPS protocol in step 510. Once discovery service 602 receives the message of step 510, discovery service 602 could, if need be, instantiate a new SkyGate 612,614, and 616 in cluster 212 if the currently instantiated SkyGates are at maximum capacity.

In step 520, discovery service 602 processes the message sent by StarGate 350 in step 510, discovery service 602 sends a response to StarGate 350, and StarGate 350 receives the response from discovery service 602. The response from discovery service 602 identifies the address of the SkyGate at which the StarGate 350 should direct future communications to cluster 212 in this communication session. For ease of providing a concrete example, step 530 of FIG. 5 will be explained with reference to the response of step 520 providing StarGate 350 with the address of SkyGate 614 in step 520.

In addition to the response of step 520 identifying the address of a particular SkyGate, in an embodiment the response of step 520 may also contain an authorization token. In such an embodiment, when the discovery service receives the message of step 510, the discovery service may contain an authentication service, using the information that identifies StarGate 350 contained in the message received from StarGate 350, to authenticate StarGate 350. Upon successfully being authenticated by the authentication service, the authentication service will provide the discovery service an authentication token, which the discovery service will provide to the StarGate 350.

Various embodiments may follow different methodologies for assigning SkyGates to StarGates. For example, in one embodiment, a discovery service may assign all communications from a single cluster to a single SkyGate. Alternately, in another embodiment, a discovery service may assign responsibility to handle a particular communication to a SkyGate based on the current load of all SkyGates so that the load is evenly distributed as best possible.

In step 530, StarGate 350 connects to SkyGate 614 using the address contained in the response received from the discovery service in step 520. In an embodiment, if StarGate 350 received an authentication token from the discovery service, then in step 530 StarGate 350 includes the authentication token with any communication with SkyGate 614. SkyGate 614 authenticates the authentication token each communication with StarGate 350. If the authentication token is not valid (for example, the authentication token may have expired), then SkyGate 614 informs StarGate 350 that the authentication token was invalid so StarGate 350 can re-authenticate itself by contacting a discovery service to reestablish valid authentication credentials.

Having described the steps of how StarGate 350 at cluster 222 communicates with a SkyGate of cluster 212, additional description will now be provided regarding the components depicted in FIG. 6. As may be surmised from the above explanation, discovery services 602, 604, and 606 represent software modules which are responsible for authenticating StarGate communications and assigning a particular SkyGate to handle communication with an authenticated StarGate.

SkyGates 612, 614, and 616 represent software modules which perform services at cluster 212. SkyGates are, for the most part, stateless, which advantageously allows SkyGates to be stopped and started as needed. To ensure that a recently started SkyGate has the information necessary to perform useful work, each of the SkyGates in cluster 212 store and retrieve data from a shared in memory cache 620 and a shared database 630. Shared in memory cache 620 is used to persist the cache of all SkyGates throughout cluster 212. Similarly, all SkyGates in cluster 212 process data in the performance of a service and store the processed data in shared database 630.

In an embodiment, shared database 630 stores UI data 640 that describes the visual appearance of user interfaces. To understand how user interfaces may be provided by some embodiments, consider FIG. 7, which is an illustration of certain components in cluster 212.

Figure 7:
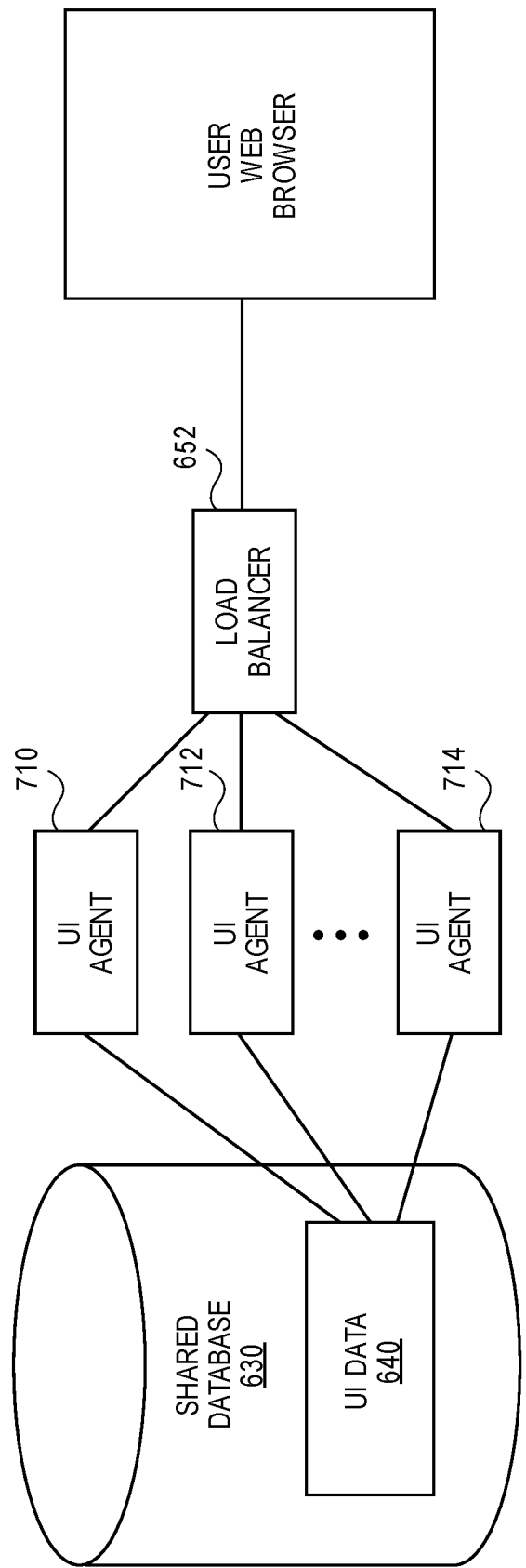
FIG. 7 is an illustration of certain components in a cluster according to an embodiment.

As depicted in FIG. 7, UI data 640 is data that describes one or more user interfaces (or "UI") for a particular customer, such as user 230. UI Agents 710, 712, and 714 represent software modules that retrieve UI data 640 for a particular customer 640 from shared database 630 and provide the user interface to the customer (such as the user's web browser as depicted in the example FIG. 7). In servicing requests from a user's web browser, UI Agents 710, 712, and 714 may retrieve data from shared database 630 and/or from shared database for cluster 222.

Load balancer 652 helps distribute load between UI agents 710, 712, and 714 and the customer. While only one load balancer is depicted in FIG. 7, some embodiments may employ any number of load balancers.

Figure 8:
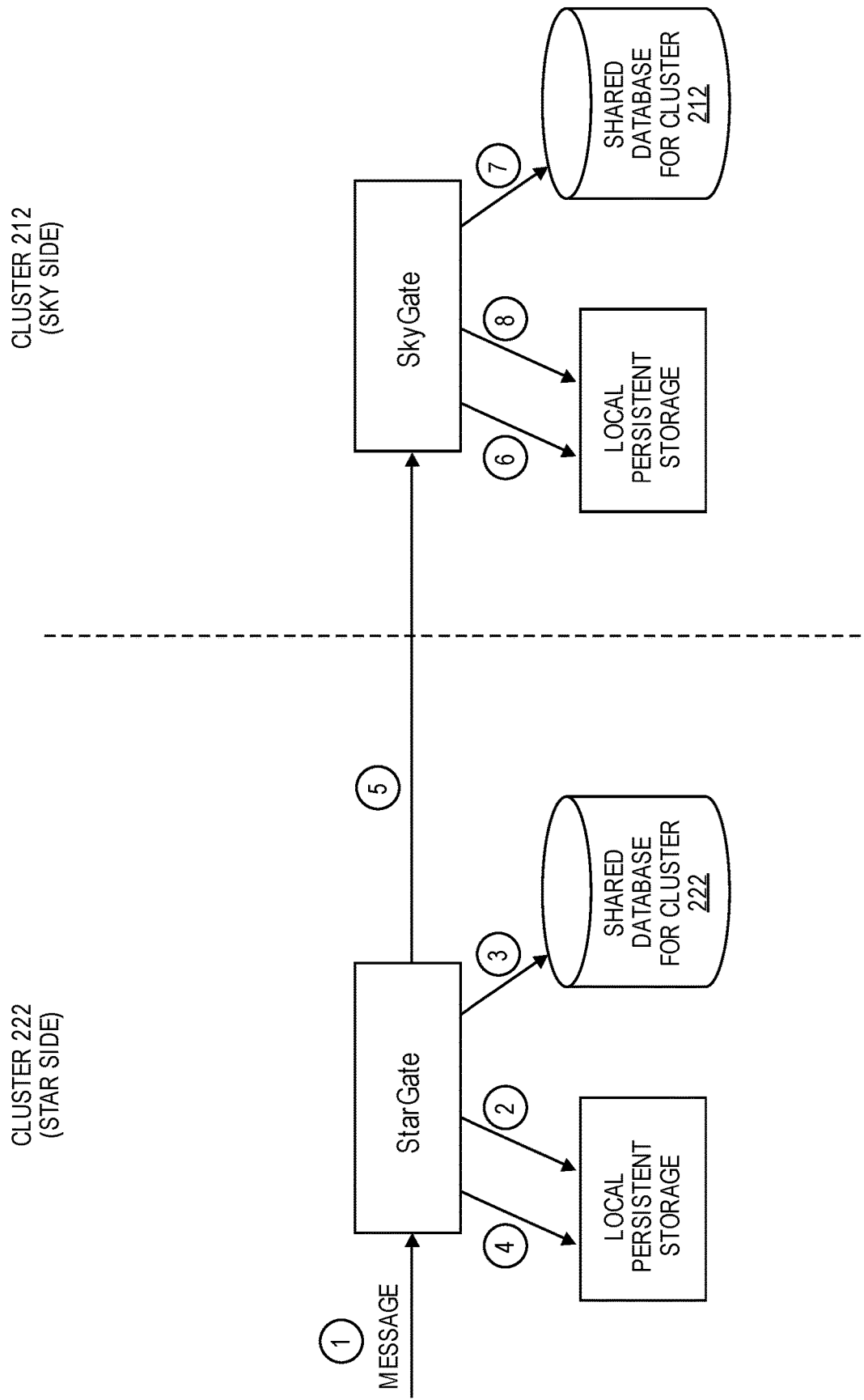
FIG. 8 is an illustration of how communications may be exchanged between a StarGate and a SkyGate in a stateful manner according to an embodiment.

FIG. 8 is an illustration of how communications may be exchanged between a StarGate and a SkyGate in a stateful manner according to an embodiment. Initially, a message to be sent to a SkyGate is received (step 1) at a StarGate. Thereafter, the message is stored (step 2) in local persistent storage, such as a hard-disk drive or flash memory accessible to the node on which the StarGate resides. After the message to be sent is locally stored at the node on which the StarGate resides, the StarGate causes the message to be written (step 3) to a shared database for cluster 222. Each of the nodes of cluster 222 can read and write to this shared database. Once the StarGate receives acknowledgement that the message has been written to the shared database for cluster 222, the StarGate deletes or removes (step 4) the message from the local persistent storage for the StarGate. Thereafter, the StarGate sends the message (step 5) to the SkyGate.

Once the SkyGate receives the message, the SkyGate causes the received message to be written (step 6) to local persistent storage, such as a hard-disk drive or flash memory accessible to the node on which the SkyGate resides. After the received message is locally stored at the node on which the SkyGate resides, the SkyGate causes the message to be written (step 7) to a shared database for cluster 212. Each of the nodes of cluster 212 can read and write to this shared database. Once the SkyGate receives acknowledgement that the message has been written to the shared database for cluster 212, the SkyGate deletes or removes (step 8) the message from the local persistent storage for the SkyGate. Thereafter, the SkyGate processes the message and performs any work necessary that was requested by the message. When the SkyGate responds to the StarGate, the process will be similar to that described above, but in reverse.

Advantageously, the approach described above with reference to FIG. 8 persistently documents the progress of the message. A message may become lost due to a process going down or a network issue. If an acknowledgement to a sent message is not received within a certain amount of time, then the message can be resent. If an acknowledgment to one or more resent messages is not received, then the StarNet associated with the sending entity is notified to ensure proper recovery procedures may be performed.

Communication from the Cloud-Service Provider to the Cloudservice Consumer

Figure 9:
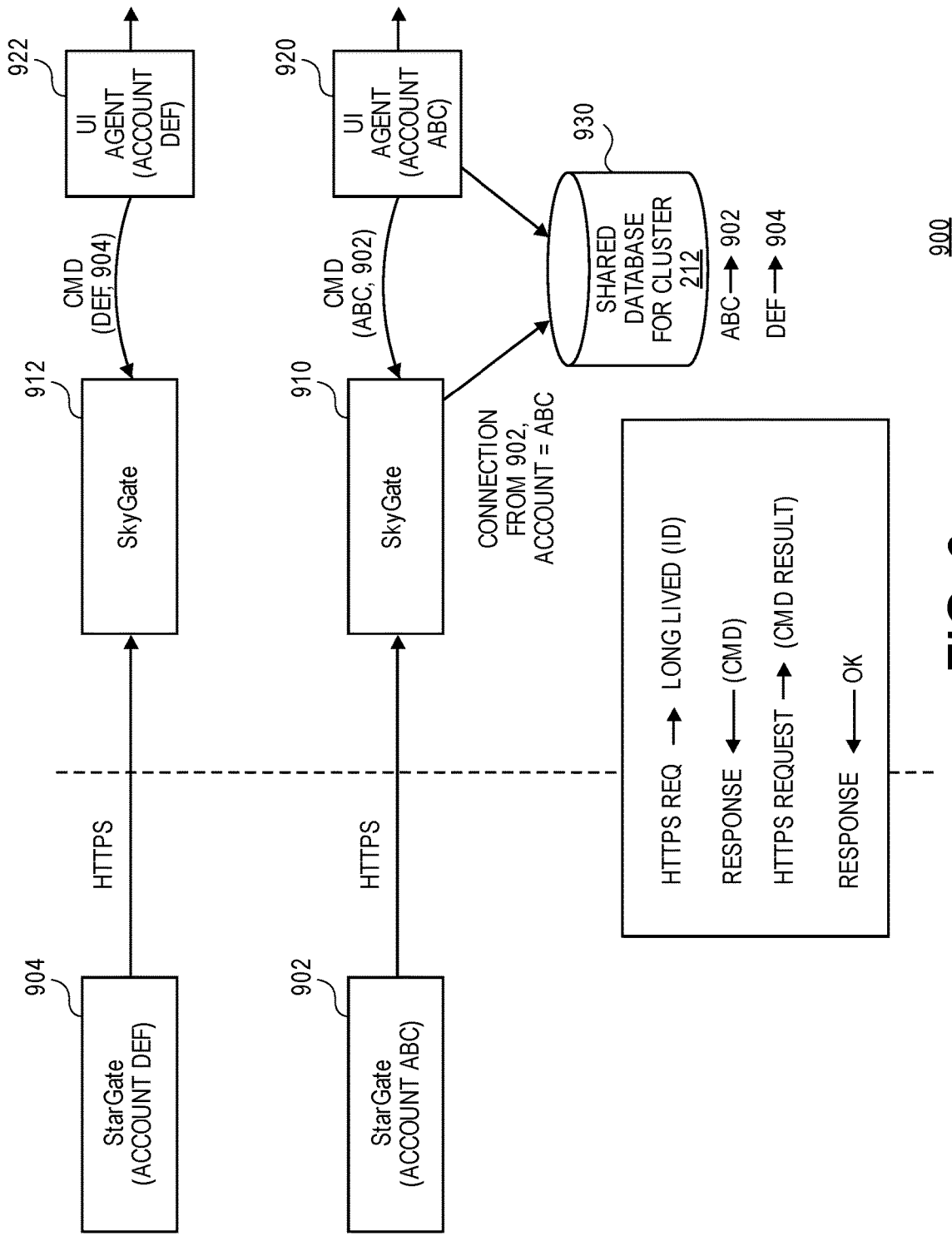
FIG. 9 is an illustration of how StarGates may send communications to a node of cluster 222 (the cloud-service consumer) according to an embodiment.

FIG. 9 is an illustration of how SkyGates may send communications to a node of cluster 222 (the cloud-service consumer) according to an embodiment. Recall that nodes of the cloud-service consumer may use discover services to ascertain the address at which a SkyGate may be found. When a user interface sends a message to another cluster, the user interface needs to send the message to a particular node of a cluster. However, directly sending a message from the user interface to a particular node of a cluster would require that the cloud-service consumer allow parties external to the cloud-service consumer to connect to the cluster, which might entail allowing such connections through a secure firewall, thereby introducing a security hole. Accordingly, the process described below with reference to FIG. 9 may be employed by certain embodiments to allow SkyGates to communicate to nodes inside cluster 222.

Virtually all firewalls allow an outgoing connection on port 443 on the firewall for HTTPS traffic. Embodiments may use this outbound port 443 on the firewall for cluster 222 to achieve an incoming message to cluster 222.

Each time a HTTPS connection is sent from a StarGate in cluster 222 (the cloud service consumer) to a SkyGate in cluster 212 (the cloud-service producer), the SkyGate stores in the shared database for cluster 212 information that identifies the account associated with each StarGate to which the SkyGate is communicating. For example, assume that in FIG. 9 StarGate 902 is associated with account ABC while StarGate 904 is associated with account DEF. Since StarGate 902 sent an HTTPS communication to SkyGate 910, SkyGate 910 reviews the received HTTPS communication from StarGate 902 and subsequently stores in shared database 930 information identifying StarGate 902 as being associated with account ABC (as shown in FIG. 9). Similarly, as StarGate 904 sent an HTTPS communication to SkyGate 912, SkyGate 912 reviews the received HTTPS communication from StarGate 904 and subsequently stores in shared database 930 information identifying StarGate 904 as being associated with account DEF (as shown in FIG. 9).

When StarGates 902 and 904 send HTTPS requests to a SkyGate, they are configured to be a long lived HTTPS request. Thus, after StarGate 902 sends a long lived HTTPS request to SkyGate 910, StarGate 902 will idle waiting for a response. Similarly, after StarGate 904 sends a long lived HTTPS request to SkyGate 912, StarGate 904 will idle waiting for a response.

Thus, when UI agent needs to send a command or message, the UI agent may do so by determining which StarGate associated with that account is currently idling and waiting for a HTTPS response, and thereafter may send the command or message to that StarGate.

For example, assume that UI agent 920 needs to issue a command associated with account ABC. UI agent 920 may consult shared database 930 to ascertain that StarGate 902 is currently idling and associated with account ABC. Thereafter, UI agent 920 may instruct SkyGate 910 to send the command to StarGate 902. SkyGate 910 can do so by sending the HTTPS response back over port 443 to StarGate 902. Once the command is performed, then StarGate 902 can send a new HTTPS request to SkyGate 910 that provides the result of performing the command. SkyGate 910 can pass along the result of performing the command to UI agent 920 and thereafter may send a HTTPS response back to StarGate 902 to close the HTTPS communication.

As another example, assume that UI agent 922 needs to issue a command associated with account DEF. UI agent 922 may consult shared database 930 to ascertain that StarGate 904 is currently idling and associated with account DEF. Thereafter, UI agent 922 may instruct SkyGate 912 to send the command to StarGate 904. SkyGate 912 can do so by sending the HTTPS response back over port 443 to StarGate 904. Once the command is performed, then StarGate 904 can send a new HTTPS request to SkyGate 912 that provides the result of performing the command. SkyGate 912 can pass along the result of performing the command to UI agent 922 and thereafter may send a HTTPS response back to StarGate 904 to close the HTTPS communication.

As may be appreciated, at any given time there may be a pool of StarGates, associated with a plurality of different accounts, which may idle until a SkyGate sends a HTTPS response back to the StarGate. In this way, SkyGates may send incoming commands and messages to StarGates using only an outbound HTTPS port. Embodiments may be configured to permit each StarGate to have multiple outstanding HTTPS requests to a SkyGate to facilitate fast communication of multiple messages.

Hybrid Cloud Environment

The approaches discussed herein may be used to enable a cloud service consumer 220 to use their own user interfaces stored at the cloud service provider 210, such as Amazon Web Services (AWS) Cloud Service offered by Amazon Web Services, Microsoft Azure offered by Microsoft, Inc., and the Google Cloud offered by Google, Inc. To do so, cloud service consumer 220 would use their own user interfaces as described above to communicate with cloud service provider 210. Cloud service provider 210 would in turn communicate with the public cloud providers using an Application Program Interface (API) exposed by such public cloud providers. Unlike prior approaches, cloud service consumer 220 can use their own user interface, maintained using their own infrastructure which also stores their own user data, in conjunction with certain public cloud providers.

Hardware Mechanisms

Figure 10:
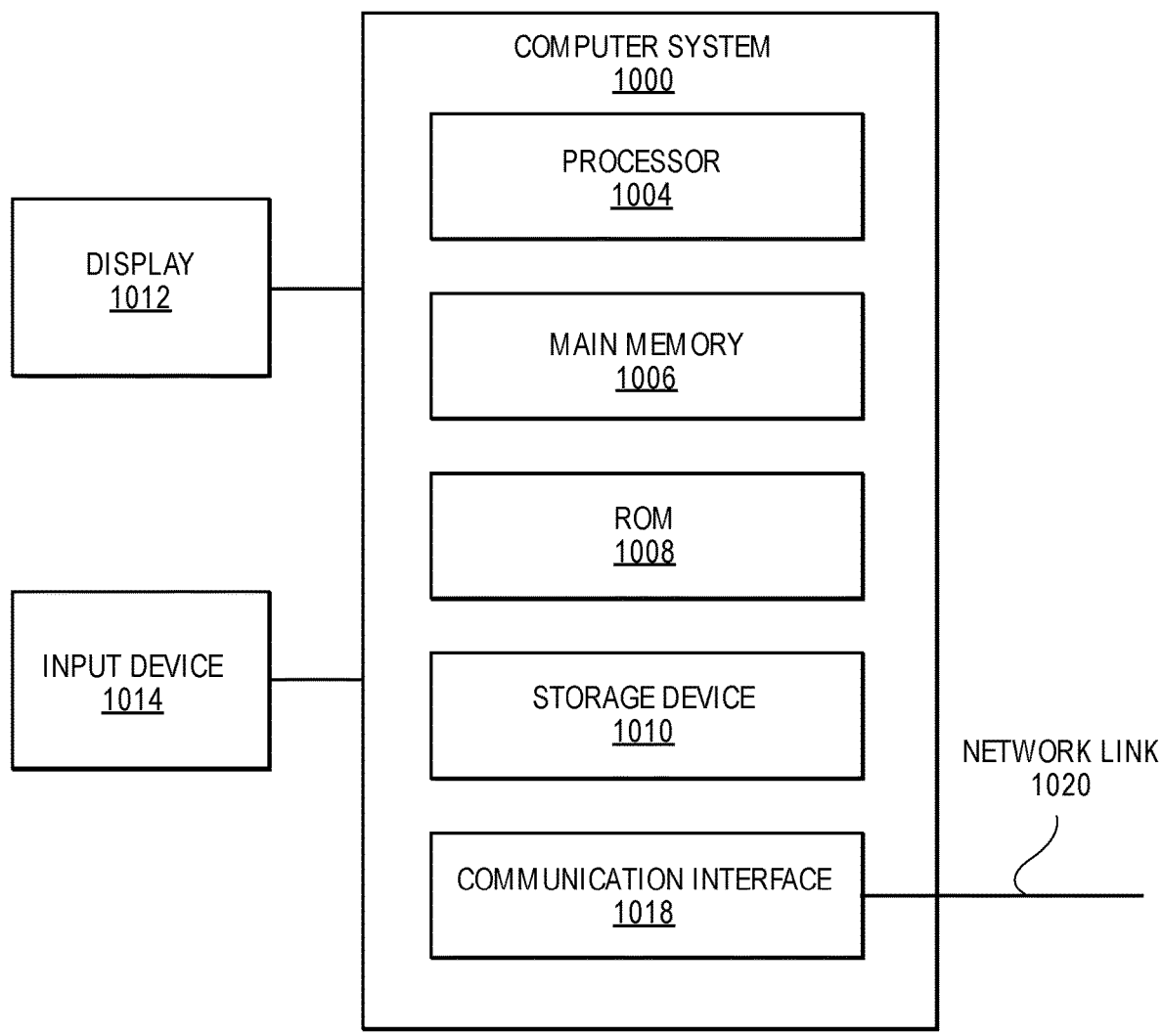
FIG. 10 is a block diagram that illustrates a computer system upon which an embodiment may be implemented.

In an embodiment, each node of a cluster may be implemented on, or correspond to, a computer system. Additionally, each customer may access the services of a cloud-based consumer 220 using a computer system. FIG. 10 is a block diagram that illustrates a computer system 1000 upon which an embodiment may be implemented. In an embodiment, computer system 1000 includes processor 1004, main memory 1006, ROM 1008, storage device 1010, and communication interface 1018. Computer system 1000 includes at least one processor 1004 for processing information. Computer system 1000 also includes a main memory 1006, such as a random access memory (RAM) or other dynamic storage device, for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device for storing static information and instructions for processor 1004. A storage device 1010, such as a magnetic disk or optical disk, is provided for storing information and instructions.

Computer system 1000 may be coupled to a display 1012, such as a cathode ray tube (CRT), a LCD monitor, and a television set, for displaying information to a user. An input device 1014, including alphanumeric and other keys, is coupled to computer system 1000 for communicating information and command selections to processor 1004. Other non-limiting, illustrative examples of input device 1014 include a mouse, a trackball, or cursor direction keys for communicating direction information and command selections to processor 1004 and for controlling cursor movement on display 1012. While only one input device 1014 is depicted in FIG. 10, embodiments may include any number of input devices 1014 coupled to computer system 1000.

Some embodiments may be related to the use of computer system 1000 for implementing the techniques described herein. According to one embodiment, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement embodiments. Thus, embodiments are not limited to any specific combination of hardware circuitry and software.

The term "machine-readable storage medium" as used herein refers to any tangible medium that participates in storing instructions which may be provided to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006.

Non-limiting, illustrative examples of machine-readable media include, for example, a floppy disk, a flexible disk, hard disk, magnetic tape, or any other magnetic medium, a CDROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a network link 1020 to computer system 1000.

Communication interface 1018 provides a two-way data communication coupling to a network link 1020 that is connected to a local network. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through a local network to a host computer or to data equipment operated by an Internet Service Provider (ISP).

Computer system 1000 can send messages and receive data, including program code, through the network(s), network link 1020 and communication interface 1018. For example, a server might transmit a requested code for an application program through the Internet, a local ISP, a local network, subsequently to communication interface 1018. The received code may be executed by processor 1004 as it is received, and/or stored in storage device 1010, or other nonvolatile storage for later execution.

In the foregoing specification, some embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of program instructions for operating a first cluster of servers, the program instructions being configured to be executable by one or more processors of the first cluster of servers to perform operations comprising:
    maintaining a shared database that stores, for each of a plurality of cloud service consumers, user interface data that describes an appearance of a user interface for the cloud service consumer, wherein each server in the first cluster can read and write to the shared database;
    receiving, from a customer computer, a request to access services of an identified cloud service consumer among the plurality of cloud service consumers, wherein the customer computer is associated with a customer of the identified cloud service consumer;
    retrieving the user interface data of the identified cloud service consumer from the shared database;
    retrieving, from a second cluster of servers maintained by the identified cloud service consumer, user data required in response to the request; and
    providing the user interface data of the identified cloud service consumer and the user data to the customer computer.

2. The one or more non-transitory computer-readable storage mediums of claim 1, the operations further comprising:
    storing, for a plurality of messages being communicated between the cluster of servers maintained by one of the cloud service consumers and one of the customer computers through the first cluster, each message in the shared database; and
    resending any of the stored messages that have not been acknowledged as having been received within a timeout period.

3. The one or more non-transitory computer-readable storage mediums of claim 1, the operations further comprising:
    running one or more first software modules on each node of the first cluster, wherein, for each of the one or more first software modules on each node, the first software module is responsible for communicating with the first software modules on other nodes of the first cluster; and
    running one or more second software modules on each node of the first cluster, wherein, for each of the one or more second software modules on each node, the second software module is responsible for communicating with the second software modules on a node of the second cluster.

4. The one or more non-transitory computer-readable storage mediums of claim 3, the operations further comprising:
    running a third software module on each node of the first cluster, wherein, for each node of the first cluster, the third software module is responsible for monitoring operation of the first and second software modules on the node.

5. The one or more non-transitory computer-readable storage mediums of claim 4, wherein the third software module executes in a host operating system of the node.

6. The one or more non-transitory machine-readable storage mediums of claim 4, the operations further comprising:
    the third software module assuring that at least a specified number of instances of the first and second software modules are executing in the first cluster or on each node of the first cluster; and
    the third software module restarting an instance of the first or second software module in response to detecting that the instance of the first or second software module has ceased execution, wherein the first or second software module may be restarted on the same or different node within the first cluster.

7. The one or more non-transitory machine-readable storage mediums of claim 1, the operations further comprising:
    performing a service on each node of the first cluster by processing data retrieved from the shared database; and
    storing the processed data in the shared database.

8. The one or more non-transitory machine-readable storage mediums of claim 3, the operations further comprising:
    running a plurality of user interface agents on the first cluster, wherein each user interface agent is responsible for retrieving, for each request, the user interface of the identified cloud service consumer from the shared database and providing, for each request, the user interface of the identified cloud service consumer to the web browser on the customer computer from which the request was received.

9. The one or more non-transitory machine-readable storage mediums of claim 8, the operations further comprising:
    running a load balancing software module on the first cluster for distributing a load of requests between the plurality of user interface agents, wherein each request is received from a customer computer among the plurality of customer computers.

10. The one or more non-transitory machine-readable storage mediums of claim 3, the operations further comprising:
running a discovery service on the first cluster;
the discovery service receiving a first request for a connection to the first cluster from a software module on a node of the second cluster, wherein the first request includes an address for the software module on the node of the second cluster; and
the discovery service sending an address and an authentication token to the node of the second cluster, wherein the address sent to the node of the second cluster is for a particular instance of the second software module assigned to handle subsequent messages from the software module on the node of the second cluster.

11. The one or more non-transitory machine-readable storage mediums of claim 10, wherein the first cluster runs a plurality of discovery services having a common address.

12. The one or more non-transitory machine-readable storage mediums of claim 10, the operations further comprising:
the particular instance of the second software module receiving a subsequent message from the software module on the node of the second cluster, wherein the subsequent message includes an address of the software module that sent the subsequent message and an identified account of the cloud service consumer; and
the particular instance of the second software module storing, in the shared database, the address of the software module that sent the subsequent message in association with the identified account of the cloud service consumer.

13. The one or more non-transitory machine-readable storage mediums of claim 12, wherein the first cluster runs a plurality of discovery services having a common address, and wherein the second software module assigned to handle subsequent communication with the node of the second cluster is instantiated by the discovery service in response to determining that the currently instantiated second software modules are at maximum capacity.

14. The one or more non-transitory machine-readable storage mediums of claim 12, the operations further comprising:
receiving a user request from a customer computer through the user interface, wherein the user request identifies an account;
identifying, from the shared database, the address of the software module on the node of the second cluster that is associated with the account in the user request; and
sending the user request to the software module at the identified address for processing user data that is not available on the first cluster.

15. The one or more non-transitory computer-readable storage mediums of claim 12, wherein the subsequent message received from the software module of the second cluster is an open HTTPS response request, the operations further comprising:
the particular instance of the second software module storing, in the shared database, an indication that there is an open HTTPS response request associated with the address of the software module that sent the subsequent message; and
the first cluster of servers further identifying, from the shared database, that the software module on the node of the second cluster has an open HTTPS response request, wherein the user request is sent to the software module in an HTTPS response to the open HTTPS response request.

16. The one or more non-transitory machine-readable storage mediums of claim 1, wherein communications between the first cluster of servers and the second cluster of servers are transmitted over a wide area network.

17. A method for operating a first cluster of servers, comprising:
maintaining a shared database that stores, for each of a plurality of cloud service consumers, user interface data that describes an appearance of a user interface for the cloud service consumer, wherein each server in the first cluster can read and write to the shared database;
receiving, from a customer computer, a request to access services of an identified cloud service consumer among the plurality of cloud service consumers, wherein the customer computer is associated with a customer of the identified cloud service consumer;
retrieving user interface data from the shared database;
retrieving from a second cluster of servers maintained by the identified cloud service consumer, user data required in response to the request; and
providing the user interface of the identified cloud service consumer and the user data to the customer computer.

18. The method of claim 17, further comprising:
storing, for a plurality of messages being communicated between the second cluster of servers maintained by one of the cloud service consumers and one of the customer computers through the first cluster, each message in the shared database; and
resending any of the stored message that has not been acknowledged as having been received within a timeout period.

19. The method of claim 17, further comprising:
running one or more first software modules on each node of the first cluster, wherein, for each of the one or more first software modules on each node of the first cluster, the first software module is responsible for communicating with first software modules on other nodes of the first cluster; and
running one or more second software modules on each node of the first cluster, wherein, for each of the one or more second software modules on each node of the first cluster, the second software module is responsible for communicating with a second software module on a node of the second cluster.

20. One or more non-transitory machine-readable storage mediums storing one or more sequences of program instructions for operating a first cluster of servers, the program instructions being configured to be executable by one or more processors of the first cluster of servers to perform operations comprising:
maintaining a shared database that stores, for each of a plurality of cloud service consumers, user interface data that describes an appearance of a user interface for the cloud service consumer, wherein each server in the first cluster can read and write to the shared database;
receiving, from each of a plurality of customer computers, a request to access services of an identified cloud service consumer among the plurality of cloud service consumers, wherein each of the customer computers is associated with a customer of one or more of the cloud service consumers;
retrieving, for each request, user interface data from the shared database and providing the user interface of the identified cloud service consumer to a web browser on the customer computer from which the request was received;

retrieving, for each request, user data of the customer associated with the customer computer from which the request was received; and providing, for each request, the retrieved user data to the web browser on the customer computer from which the request was received, wherein the user data of the customer is retrieved from a separate cluster of servers maintained by the identified cloud service consumer that was identified in the request.

\* \* \* \* \*